United States Patent [19]

Hook

[11] 3,982,114

[45] Sept. 21, 1976

[54] SIGNAL PROCESSING SYSTEM

[75] Inventor: William R. Hook, Los Angeles, Calif.

[73] Assignee: TRW Inc., Redondo Beach, Calif.

[22] Filed: Aug. 28, 1961

[21] Appl. No.: 136,141

[52] U.S. Cl. .......................... 235/181; 343/100 CL; 325/303

[51] Int. Cl.[2] .......................................... G06F 15/34

[58] Field of Search ................... 343/100.7, 100 CL; 250/20.54 D; 325/303, 305, 427; 235/181

[56] References Cited

UNITED STATES PATENTS

| | | | |
|---|---|---|---|
| 2,175,270 | 10/1939 | Koch | 250/20.54 D |
| 2,664,243 | 12/1953 | Hurvitz | 343/100.7 |
| 2,688,124 | 8/1954 | Doty et al. | 235/181 |
| 2,799,734 | 7/1957 | Camp | 343/100.7 |
| 2,800,654 | 7/1957 | Rosa | 343/100.7 |
| 2,885,590 | 5/1959 | Fuller | 343/100.7 |
| 3,154,778 | 10/1964 | Kock | 235/181 |
| 3,157,781 | 11/1964 | Gruen | 343/100 CL |
| 3,212,092 | 10/1965 | Anderson et al. | 235/181 |

*Primary Examiner*—Howard A. Birmiel
*Attorney, Agent, or Firm*—Daniel T. Anderson; Edwin A. Oser; Jerry A. Dinardo

EXEMPLARY CLAIM

1. A correlation system for two complex multifrequency input signals which may contain relatively strong narrow band components including the combination of: auto-correlator means responsive to one of the input signals, the auto-correlator means dividing the one input signal into two channels and including delay means in one of the channels for introducing a fixed relative timing displacement between the two signals, threshold means coupled to the auto-correlator means for indicating when the auto-correlation output signal exceeds a selected amplitude, first and second delay means each responsive to a different one of the input signals and introducing like delays thereto, gating means coupled to at least one of the delay means and controllably responsive to the threshold means, and correlator means coupled to said delay means and said gating means for correlating the two input signals therefrom.

12 Claims, 5 Drawing Figures

TYPICAL CORRELATION FUNCTIONS

SIGNAL PROCESSING SYSTEM

This invention relates to systems for processing signals in accordance with their bandwidth or frequency component characteristics and more particularly to electrical signal correlators which have improved accuracy and reliability.

Electrical signal processing systems are often required to identify, accept or reject narrow band or single frequency components at specific or unknown frequencies. A familiar example is the simple band reject filter which may block transmisssion of an undesired signal frequency. Other examples are found in speech recognition and pattern identification work. Vowel sounds in speech, for example, are characterized by the presence of identifiable monofrequency components, whereas sibilant and other frictional sounds are essentially noiselike in character and may be distinguished thereby.

Correlation systems provide a specific example of electronic equipment which can be affected by narrow band signal components in the signals being processed. Signal correlation techniques derive useful information about the presence and timing relationship of electrical signals by multiplying together two time varying electrical signals to form a product signal which is then time averaged to provide a correlation output signal. When the two time varying electrical signals are at least partially mutually coherent, that is when the spectral power distribution of each contains a complex multifrequency component which substantially conforms to a given amplitude versus time function, then the correlation output signal may readily indicate such fact despite high random noise levels. The correlation function of two input signals is defined in graphical form by the variation in the magnitude of a correlation output signal with respect to a range of relative timing displacements between the mutually coherent signal components of the two signals.

Many correlation systems are used as locator and ranging systems, and equate the relative timing displacement between signals to a path-length-difference by which the position of a distant, radiating source may be determined. The mutually coherent signal components of the two signals which are correlated seldom occur in time coincidence with each other, but are displaced by some unknown magnitude of relative timing displacement which it is desired to determine. For this purpose, variable delay devices are used to introduce a controllable relative delay between the two signals so as to enable the mutually coherent signal components to be brought into time coincidence, i.e. the condition of maximum correlation. The magnitude of the delay when this condition is reached provides a measure of the relative timing displacement, hereafter referred to as Tau ($\tau$), from which the path-length-difference and location of the signal source may be computed.

The accuracy with which relative timing displacement can be measured is directly dependent (other factors remaining constant) upon the bandwidth of the two time varying electrical signals, being approximately an inverse function of the system bandwidth. More specifically, the more uniform and wider the spectral power distribution of the mutually coherent signal components, the sharper will be the peak which is found at the condition of maximum correlation in the correlation function. When the input signals are effectively of a single frequency, the correlation output signal has a constant value for all relative timing displacements and is consequently meaningless.

In practical systems, of course, the correlation function must reasonably sharply define the condition of maximum correlation. Maximum correlation relationships are usually identified by a threshold circuit which responds to correlation output signals exceeding a selected level, so that the system distinguishes against random noise with a satisfactory degree of probability. If the range of values of $\tau$ over which the threshold circuit responds is too large, path-lenth-difference will be indicated with such a wide variation that there can be no accurate location of the position of the distant radiating source. The presence of narrow band signals may also tend to overload the threshold and other processing circuitry, and such effects may arise whether the narrow band signals appear for relatively long intervals or are brief or intermittent.

Signal processing systems in accordance with the present invention overcome these and other disadvantages of prior art systems by continually testing for the presence of narrow band signal components in the input signals being processed. The signals applied to a correlator system, for example, may be tested repetitively and rejected whenever narrow band components in excess of a predetermined level are found to exist.

In accordance with a feature of the invention, a signal correlator system having automatic narrow band signal rejection is provide by auto-correlating one of the input signals. The auto-correlator operates repetitively, deriving a new correlation output signal for each successive time interval. The determination made during each time interval controls the application of signals to a correlator system which provides the desired final correlation output signal.

In accordance with more specific aspects of the invention, the auto-correlator system is arranged to respond to conditions under which there is an effective broadening of the correlation function beyond the limits which are to be expected for given mutually coherent signal components. The signal applied to the correlation system is delayed a selected amount, to allow decisions to be made by analysis of the auto-correlator input signals. The delayed signal is then gated into the correlation system by a switching system controlled by the auto-correlator as the other signal to be correlated is correspondingly delayed. The switching system inactivates the signal input during intervals in which excessive narrow band components are present.

A better understanding of the invention may be had by reference to the following description, taken in conjunction with the accompanying drawings, in which.

Figure 1:
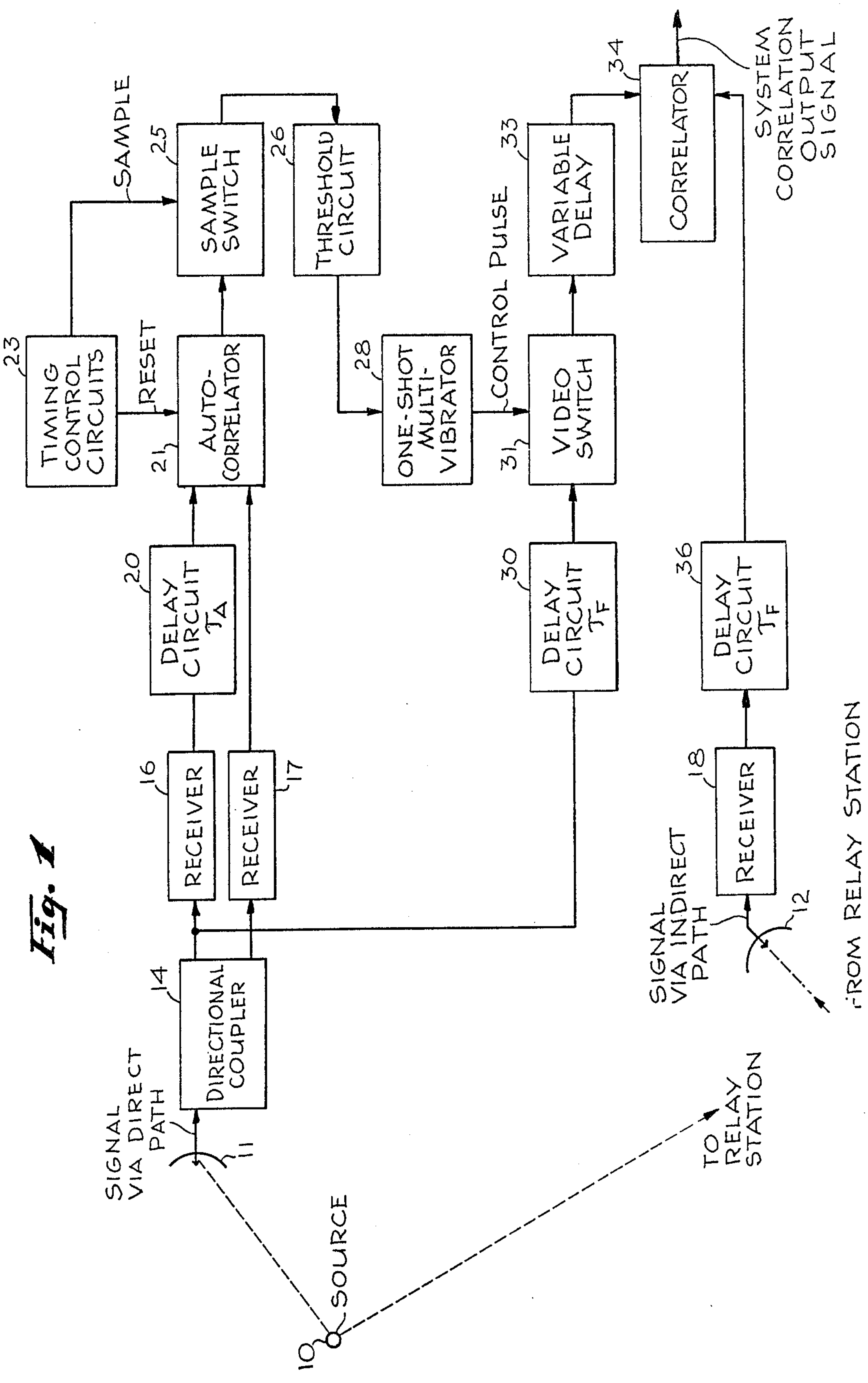
FIG. 1 is a block diagram representation of one exemplification of an improved signal processing system in accordance with the invention.

A useful example of signal processing systems in accordance with the invention, referring now to FIG. 1, is in the form of a system which processes two different complex multifrequency input signals to derive path-length-differrence information from which the location of a distant signal source 10 may be computed. The elements are shown as they would normally be positioned in a path-length-difference determining system, namely with most of the equipment at one central station. Input signals are derived by a direct path from the source 10 at a first antenna 11, and by an indirect path as from a distant relay station at a second antenna 12. The input signals are complex multifrequency waves which contain random noise but which also contain mutually coherent signal components distributed across a known or determinable bandwidth. Best correlation is obtained when the mutually coherent signal components are broadband noise and, as discussed above, it is desired to avoid errors which may result when a principal part of the spectral energy distribution consists of narrow band components.

In the typical case, the input signals derived by the indirect route are obtained from receiving equipment at a fixed known location. It will be understood that the computations made in determining path-length-difference take into account the geometrical relationships between the various fixed elements of the system, where necessary.

Signals received at each antenna 11, 12 are amplified and converted to suitable intermediate frequencies for subsequent processing. At the first antenna 11, however, the signals are divided by a directional coupler 14 into two signal channels, each of which contains a separate receiver 16 and 17 respectively. Signals received via the indirect route are amplified and converted to an intermediate frequency by another receiver 18. The signals in the two channels from the first two receivers 16, 17 are applied to a resettable auto-correlator system, after introduction of a fixed delay in one of the signals. The fixed delay is introduced by a delay circuit 20, and is selected to have a magnitude $\tau_A$ which is proportioned with respect to the bandwidth of the mutually coherent signal components. This is explained in more detail in conjunction with FIG. 5, but briefly, the magnitude of $\tau_A$ is chosen such that an appreciable correlation output signal is provided from the auto-correlator whenever an objectionable percentage of narrow band components is present in the spectral energy distributions of the two input signals.

The resettable auto-correlator system 21 is essentially a typical correlator including a multiplier circuit and integrating (time averaging) circuit. It is preferred to employ the alternating current (hereafter AC) type of correlator for most applications, so that the signals to be multiplied are converted by the receivers 16, 17 so as to be displaced in frequency by a selected amount. These signals thus give rise to product signals at a selected offset frequency, signals at this frequency being extracted by a band-pass filter and subsequently passed through a detector circuit. While the time averaging may be accomplished by a low-pass filter having a chosen time constant, it is preferred to employ controllably dischargeable storage condensers (not shown in detail in FIG. 1) for the signal integration. Reset pulses provided repetitively from timing control circuits 23 to the charging side of the condensers act to discharge the condensers to a selected voltage level, thus establishing successive independent correlation intervals. Immediately prior to the discharge, however, sample pulses are applied to a sample switch 25 coupled to the output terminal of the auto-correlator 21, to apply the signal level then maintained on the condensers to a coupled threshold circuit 26. When the stored signal level is in excess of a predetermined magnitude, the threshold circuit provides an appropriate signal indication to actuate a one-shot multivibrator 28, which then provides a common pulse of a chosen duration. Note that this control pulse occurs in a fixed time relationship to the auto-correlator 21 operating cycle. The control pulse is approximately equal in duration to the correlation interval chosen for the auto-correlator 21, which interval in turn is in excess of the time-averaging interval which is needed for suitable reliability.

Successive time segments of the input signal derived from the receiver 16 are delayed so as to be returned to proper time relationship to the corresponding time segments as represented by the control pulses from the one-shot multivibrator 28. This adjustment is effected by another fixed delay circuit 30, which produces a delay of $\tau_F$. The delay $\tau_F$ may be selected with respect to both $\tau_A$ and the correlation interval determined by the reset times of the auto-correlator 21. The signals which are multiplied together in the auto-correlator 21 produce a product which may be considered to represent an average delay of $\tau_A 12$. This product signal is then averaged over a selected period which is no greater than the correlation interval. The fixed delay $\tau_F$ may therefore be made equal to $\tau_A/2$ plus the duration of the correlation interval, so that any given time varying components in the input signal are returned to proper relation to the control pulse which is generated therefrom. In practice, the magnitude of $\tau_A/2$ is usually so small that it may be ignored and the correlation interval alone may be used as the measure of the fixed delay $\tau_A$.

A video switch 31 coupled to receive the signals from the delay circuit 30 is operated so as to be turned off by the control pulses from the one-shot multivibrator 28. Thus the video switch 31 selectively passes the input signal which is also auto-correlated to a cross-correlator system which includes a variable delay device 33 and a correlator 34. The other input signal provided to the correlator 34 is that derived from the indirect transmission path and from the second antenna 12, the receiver 18 and a fixed delay circuit 36 which also introduces a $\tau_F$ delay. The correlator 34 in the cross-correlator system is also assumed to be the AC type, with suitable multiplier, filter and detector circuits for providing a correlation output signal.

Figure 2:
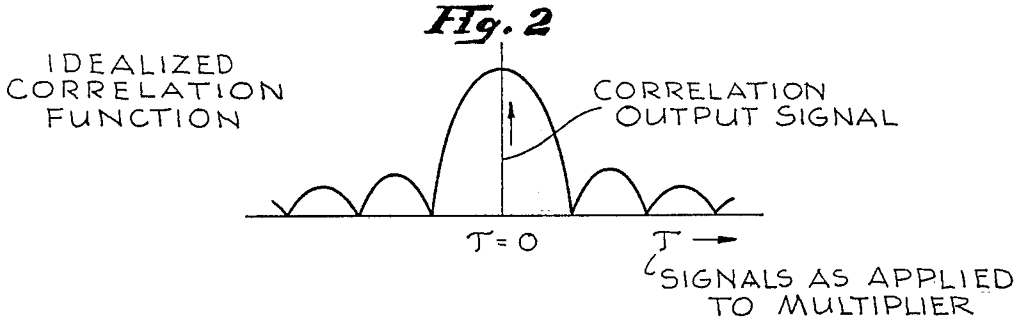
FIG. 2 is a graph of a typical idealized correlation function.
Figure 3:
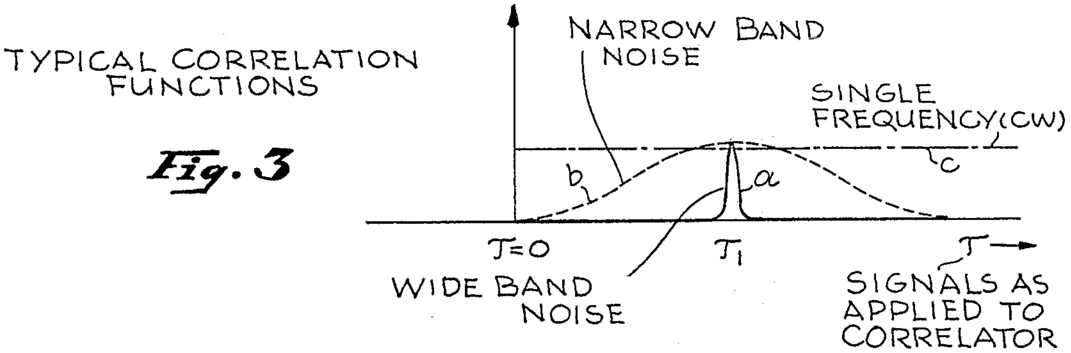
FIG. 3 is a graph showing characteristic correlation functions for different input signal frequency characteristics.

The operation and advantages of systems in accordance with the invention may be better appreciated by reference to the curves of FIGS. 2 and 3. FIG. 2 is a plot of the observed magnitude of the correlation output signal versus values of the magnitude of relative timing displacement $\tau$ between the two signals as they are multiplied together in a correlation multiplier. The correlation function which is thus defined typically takes the form of the mathematical function sinX/X but with negative variations of output signals folded over to positive values. A value of $\tau = 0$ corresponds to the of a coextensive times coincidence, or maximum correlation, between mutually coherent signal components of the respective input signals as they reach the correlation multiplier. Thus, the absolute value of relative time delay which is introduced between the initial signals to produce this maximum can then be taken to be substantially equal to the sought-after absolute value of the magnitude of relative timing displacement between the two input signals.

Actual correlation functions vary widely from the idealized form shown in FIG. 2. Typical functions are shown in FIG. 3, in which a different reference is taken as the abscissa, namely, the relative timing displacement $\tau$ between the signals as they are applied to the system for cross-correlation as a whole, and not after they have been adjusted in time by the introduction of a variable delay. The three functions which are shown are assumed to be displaced in time, as they are applied to the correlator system, by a relative timing displacement $\tau$0195 $_1$. The solid line curve (*a*) is representative of the situation in which the mutual coherent signal components are in the form of wideband noise. The relative timing displacement can readily be identified by virtue of the relatively sharp peak existing at $\tau_1$.

When the input signals have spectral power distributions which consist primarily of narrow band noise, the correlation function which is produced is typified by the dotted line curve (*b*). A well-rounded peak broadly distributed along the time base makes it extremely difficult to detect the actual relative timing displacement with any accuracy. When the spectral power distribution is such that the input signals are essentially continuous wave (CW) there is no variation whatsoever in the correlation function, as shown by the dot-dash curve (*c*).

Figure 4:
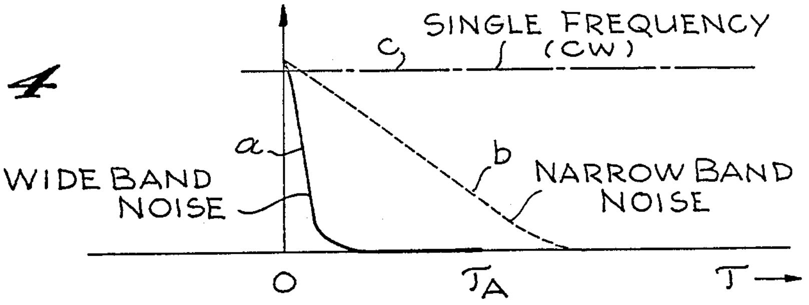
FIG. 4 is a graph of typical auto-correlation functions encountered with various input signal characteristics.

Systems in accordance with the invention, as illustrated by the system of FIG. 1, process one input signal so as to prevent erroneous indications because of the presence of narrow band components. Signals which are received by the direct path from the source 10 at the first antenna 11 area split by the directional coupler 14 into the two signal channels in which the separate receivers 16, 17 are located. One of the signals in these channels is then branched off into the delay circuit 30 which provides the $\tau_F$. Concurrently, the signals received via the indirect path at the second antenna 12 are coupled through the associated receiver 18 and also delayed by $\tau_F$ in the fixed delay circuit 36. During the $\tau_F$ delay interval, the resettable auto-correlator system analyzes the input signals for narrow band components. At the start of each correlation interval, the integrating condensers in the auto-correlator 21 are discharged to a selected level. The charge which is built up and the voltage level which is reached during the next correlation interval are therefore independent of the previous period. FIG. 4 represents typical auto-correlation functions, with the solid line curve (*a*) representing the sharply peaked characteristic function which is obtained with wideband noise. With the timing displacement $\tau_A$ which is introduced by the fixed delay circuit 20 the auto-correlation output signal is well outside this peak region for wideband noise.

With narrow band noise providing the mutually coherent signal components or with only a single frequency component, however, the auto-correlation functions provide sharply differing values at a timing displacement of $\tau_A$. Thus, the dotted line curve (*b*) corresponding to narrow band noise provides a much more gradual peak and an appreciable correlation output signal at $\tau_A$. The dot-dash curve (*c*) which represents CW has a constant magnitude throughout the entire range of $\tau$ values.

At the end of the correlation interval, therefore, the correlation output signal which is built up is representative of the nature of the energy distribution in the signals which are correlated over the interval. When the output signal is sampled by the sample switch 25 under control of timing control circuits 23 at the end of each correlation interval, therefore, the signal which is applied to the threshold circuit 26 likewise provides an accurate measure of these components. The level of the threshold circuit 26 is selected so that the circuit 26 responds with an appropriate output indication whenever more than a predetermined proportion of narrow band components exists in the input signals. An indication from the threshold circuit 26 accordingly actuates the one-shot multivibrator 28 to provide the desired control pulse and to prevent passage of signals through the video switch 31.

The operation of the correlator system 34 is controlled by the video switch 31, because when one signal is blocked off entirely no correlation output signal results for a corresponding interval. The delay circuits 30, 36 return the two input signals to be correlated into proper time relationship to the components giving rise to the control pulse which operates the video switch 31. That is, the signals which are gated through or blocked at the video switch 31 are the same signals which were previously analyzed in the resettable auto-correlator system. Thereafter, in conventional correlator fashion, a variable delay of controllable and known magnitude may be introduced by a delay device 33 as the signals are applied to the correlator 34, to compensate for the relative timing displacement between the mutually coherent signal components, so that the path-length-difference may be computed. Details of the variable delay device 33, which may be a scanning or tracking mechanism used in conjunction with the correlator system, have not been illustrated in order to simplify the presentation. Those skilled in the art will, however, recognize that the magnitude of the variable delay introduced at the instant at which there is maximum correlation provides the basis from which path-length-difference and ultimately the postion of the distant source may be computed.

Figure 5:
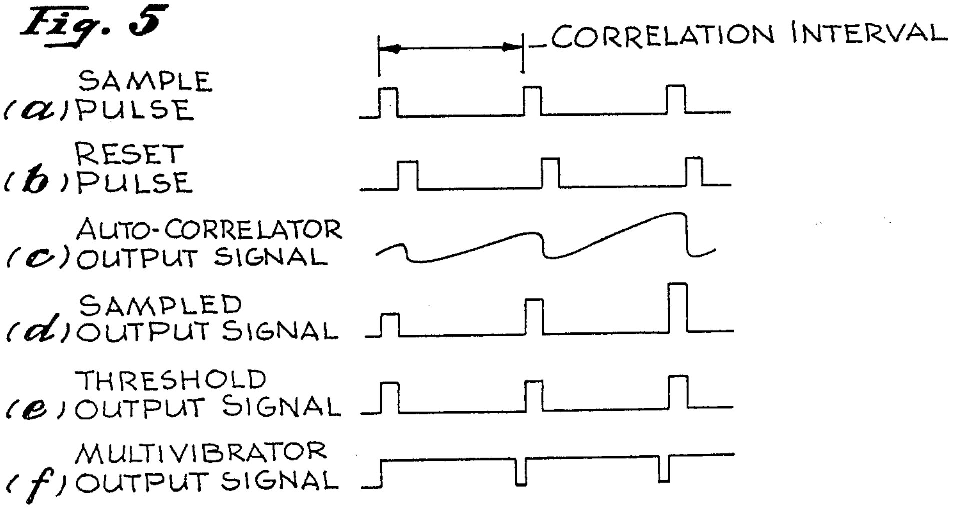
FIG. 5, consisting of waveforms 5(*a*) to 5(*f*), is a plot of amplitude versus time for a number of different typical signals which may be encountered in the operation of the system of FIG. 1.

The sequence of operations may also be understood by reference to the curves of FIG. 5 in conjunction with the arrangement of FIG. 1. The timing control circuits 23 provide sample pulses to the sample switch 25 just before the end of each correlation interval, as shown by a curve (*a*) in FIG. 5. Immediately thereafter, the timing control circuits 23 provide the reset pulse to the auto-correlator 21, as shown in curve (*b*). Each reset pulse discharges the storage condensers in the resettable auto-correlator 21, returning the correlation output signal to a selected base level from which it begins to build up during the correlation interval. Typical signal build-up patterns are shown in curve (*c*) in FIG. 5, and the final amplitude attained during the correlation interval is used to control the amplitude of the output signal provided from the sample switch 25 to the threshold circuit 26. The signal applied to the input terminal of the threshold circuit 26 represented, as shown in curve (*d*) of FIG. 5, is a series of rectangular pulses of varying amplitude. When the amplitude of these individual pulses exceeds a selected threshold level, the threshold circuit 26 provides an output pulse [curve (*e*)] to actuate the one-shot multivibrator 28, which then generates a control pulse, as shown in curve (*f*) in FIG. 5 to turn off the switch 31. The pulse widths and amplitudes of the pulses shown are not drawn to scale but are merely illustrative of relationships which may be used.

The application of the system is not confined, of course, to uses in path-length-difference systems. The auto-correlator itself, independently used in conjunction with the correlator system, may be useful in many applications where the nature of the spectral power distribution of the signal is of importance. If a number of similar resettable auto-correlator systems are used in a work recognition system, each may be responsive to signals in a different frequency range and selected threshold setting. Time varying signal combinations will then be generated which accurately represent the successive phonetic elements in each spoken word. Because the correlation interval may be made extremely small, the use of the resettable correlator in this manner for effectively digitizing the information content of the spoken word provides an extremely versatile basis for word recognition.

In a broad sense, systems in accordance with the invention tell whether an input signal is broad or narrow band. Further, they identify the relative proportion of the narrow band componets. In the typical broadband communication system, the presence of an extremely strong CW component may obscure much of the information content. In many broadband systems, of course, extraneous or deliberately introduced narrow band components may have the effect of blocking all useful indications, or greatly decreasing system accuracy. Although systems in accordance with the present invention operate sequentially in the time domain, they nevertheless must properly be considered to provide a filtering action which is dependent upon signal bandwidths. Within the frequency band of the signals which are being correlated, the presence of narrow band components causes the entire system to operate as a band reject filter.

Although there have been described above and illustrated in the drawings various alternative arrangements for signal processing systems using resettable auto-correlation techniques, it will be appreciated that the invention is not limited thereto. Accordingly, the invention should be considered to include all modifications and alternative forms falling within the scope of the appended claims.

I claim:

1. A correlation system for two complex multifrequency input signals which may contain relatively strong narrow band components including the combination of: auto-correlator means responsive to one of the input signals, the auto-correlator means dividing the one input signal into two channels and including delay means in one of the channels for introducing a fixed relative timing displacement between the two signals, threshold means coupled to the auto-correlator means for indicating when the auto-correlation output signal exceeds a selected amplitude, first and second delay means each responsive to a different one of the input signals and introducing like delays thereto, gating means coupled to at least one of the delay means and controllably responsive to the threshold means, and correlator means coupled to said delay means and said gating means for correlating the two input signals therefrom.

2. A correlator system for two complex multifrequency input signals which may contain relatively strong narrow band components including the combination of means responsive to one of the input signals for dividing the signal into two channels, means inserted in one of the two channels for providing a fixed delay in the signals therein, a resettable auto-correlator coupled to receive the signals in the two channels and to provide an auto-correlation output signal, means coupled to the auto-correlator for repetitively sampling independent output signals therefrom, threshold means coupled to the means for repetitively sampling for indicating when the auto-correlation output signal exceeds a selected amplitude, delay means coupled to receive each of the input signals and to provide correspondingly delayed signals, gating means coupled to receive the delayed signals from the delay means and controllably responsive to the threshold means, and correlator means coupled to correlate the input signals which are passed by the gating means with the other of the input signals.

3. A correlator system for correlating two complex multifrequency input signals which consist primarily of broadband noise but which may contain relatively strong narrow band components including the combination of means responsive to a first one of the input signals for dividing that input signal into two channels, delay means coupled in one of the two channels for introducing a fixed delay $\tau_A$ in the relative timing displacement of the signals in the two channels, resettable auto-correlator means coupled to receive the signals in the two channels and to provide an auto-correlation output signal therefrom, the auto-correlator means being resettable to a selected output signal level, timing control means coupled to the auto-correlator means to provide repetitive reset pulses thereto, the reset pulses defining correlation intervals, the timing control means also providing sample pulses substantially immediately prior to termination of each correlation interval, sample switch means coupled to receive the output signal from the auto-correlator and controlled by the sample pulses from the timing control means, thus to provide sampled signals of variable amplitude dependent upon the amplitude of the auto-correlation output signal immediately prior to the termination of the correlation interval, threshold means coupled to receive the sampled signals and to provide pulses in response to sampled signals in excess of a selected amplitude, pulse generator means coupled to the threshold means and providing control pulses which are substantially the duration of the correlation interval, a second fixed delay circuit coupled to receive the first input signal and introducing a fixed delay $\tau_F$ thereto which is substantially equal to the correlation interval, gating means coupled to the second delay circuit and controllably responsive to the control pulses for gating out signals from the second delay circuit, a third delay circuit coupled to receive the second input signal and introducing a delay $\tau_F$ thereto, and a correlator coupled to the gating means and to the third delay circuit for correlating the signals derived therefrom.

4. A narrow band reject filter system for responding to the occurrence of any narrow band frequency components of relatively high power in input signals having a given nominal spectral power distribution, including the combination of: a resettable auto-correlator system responsive to the input signals, timing control means coupled to the auto-correlator system for successively resetting the system at a selected rate, threshold means responsive to the timing control means for identifying the occurrence of signals in excess of a selected level from the auto-correlator system, means responsive to the input signals for providing delayed representations thereof, and gating means coupled to pass the delayed representations under control of the threshold means.

5. A system for responding to the occurrence of narrow band frequency components of relatively high power in input signals having a given nominal spectral power distribution, including the combination of: a resettable auto-correlator system responsive to the input signals, timing control means coupled to the auto-correlator system for successively resetting the system at a selected rate, and threshold means responsive to the timing control means and signals from the auto-correlator system for identifying the occurrence of signals from the auto-correlator system in excess of a selected level.

6. A system for responding to the occurrence of narrow band frequency components of relatively high power in an input signal, including the combination of: a resettable auto-correlator system responsive to the input signal, the resettable auto-correlator system including means for dividing the signal into two channels and means in one of the channels for providing a selected relative timing displacement between the signals in the two channels, means coupled to reset the auto-correlator system at a selected rate in order to provide successive independent correlation output signals, and threshold means responsive to the output signals of the auto-correlator for identifying the occurrence of signals in excess of a selected level.

7. A signal correlation system employing narrow frequency band rejection comprising: separate signal paths connected to a correlator, gating means associated with at least one of the signal paths, means for analyzing the spectral content of received signals over predetermined intervals, and means responsive to the analyzing means for causing the gating means to block the associated signal path for any interval during which the magnitude of narrow band frequency components of a received signal exceeds a predetermined level.

8. A signal correlation system employing narrow frequency band rejection comprising: separate signal paths connected to a correlator, gating means associated with at least one of the signal paths, means for analyzing the spectral content of received signals over predetermined intervals, means in each of the separate signal paths for introducing a selected delay in the signals carried by the respective paths in order that signals occurring within a particular time interval may be analyzed prior to the presentation of signals within said interval to the gating means, and means responsive to the analyzing means for causing the gating means to block the associated signal path for any interval during which the magnitude of narrow band frequency components of a received signal exceeds a predetermined level.

9. A signal correlation system employing narrow frequency band rejection comprising: separate signal paths connected to a correlator, gating means associated with at least one of the signal paths, means for analyzing the spectral content of received signals over predetermined intervals, said analyzing means comprising an auto-correlator responsive to narrow band frequency components which is coupled to receive a signal applied to the signal correlation system and timing control means for repetitively resetting the auto-correlator in accordance with said predetermined intervals, and means responsive to the analyzing means for causing the gating means to block the associated signal path for any interval during which the magnitude of narrow band frequency components of a received signal exceeds a predetermined level.

10. A signal correlation system employing narrow frequency band rejection comprising: separate signal paths connected to a correlator, gating means in at least one of the signal paths, means for analyzing the spectral content of received signals over predetermined intervals including an auto-correlator responsive to narrow band frequency components which is coupled to receive a signal applied to the signal correlation system and timing control means for repetitively resetting the auto-correlator in accordance with the predetermined intervals, a threshold level circuit coupled between the auto-correlator and the gating means for receiving time-selected portions of the output of the auto-correlator and for actuating the gating means for said predetermined interval when one of said portions exceeds a present threshold level.

11. In a signal processing system, signal receiving means, signal utilization means coupled to said receiving means, switch means in the coupling between said receiving and utilization means, control means responsive to signals having selected frequency bandwidths for controlling operation of said switch means, delay means connected between said receiving means and said switch means, and means forming a portion of said control means for determining existence of said selected frequency bandwidths prior to arrival of said signal at said switch means.

12. In a signal processing system, a relative frequency bandwidth determining means comprising: coupler means for dividing a signal into two channels, selected delay means coupled in one of said two channels, autocorrelating means coupled to receive the signals in said two channels and providing a correlation function output corresponding to a selected level of relative frequency bandwidth of said signal, said correlation function output level being dependent upon the selected value of said delay means and repetitively operating means coupled to said auto-correlator means and responsive to said correlation function output for modifying the characteristics of said signal processing system in accordance with the relative frequency bandwidth of said signal.

* * * * *